US 8,055,293 B1

United States Patent
Vargantwar et al.

(10) Patent No.: US 8,055,293 B1
(45) Date of Patent: Nov. 8, 2011

(54) SELECTING A POWER-CONTROL STEP SIZE BASED ON RELATIVE SIGNAL STRENGTH AMONG SIGNALS IN AN ACTIVE SET

(75) Inventors: Sachin R Vargantwar, Overland Park, KS (US); Debasish Sarkar, Irvine, CA (US); Manoj Shetty, Overland Park, KS (US); Deveshkumar N Rai, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 395 days.

(21) Appl. No.: 12/415,872

(22) Filed: Mar. 31, 2009

(51) Int. Cl.
  *H04B 7/00* (2006.01)

(52) U.S. Cl. ........................................ 455/522; 455/423

(58) Field of Classification Search .................. 455/522, 455/423, 452.2, 296, 114.2, 127.1, 422.1, 455/67.11, 436, 437, 438; 370/329, 338, 370/336, 311, 252, 335, 331, 332, 333
See application file for complete search history.

(56) References Cited

U.S. PATENT DOCUMENTS

| 2007/0010253 | A1 | 1/2007 | Gunnarsson | |
|---|---|---|---|---|
| 2009/0137221 | A1* | 5/2009 | Nanda et al. | 455/296 |

OTHER PUBLICATIONS

Unpublished U.S. Appl. No. 11/839,275, entitled "Method And System For Forward Link And/Or Reverse Link Power Control," filed Aug. 15, 2007 in the name of Shetty et al.

* cited by examiner

*Primary Examiner* — Joseph Lauture (57) ABSTRACT

Methods and apparatus are provided for adjusting a forward-link power-control step size. An initial active set of coverage areas for a mobile station is maintained within which a first coverage area in the initial active set has a signal strength that is stronger than that of each of the other coverage areas in the initial active set. The first coverage area is determined to have dropped from the initial active set, resulting in a modified active set. In response, a signal-strength factor is calculated based on (a) a last non-zero signal-strength measurement of the first coverage area and (b) a second value. One or more forward-link power-control step sizes is selected based on at least the calculated factor. The one or more selected step sizes is used to increase the forward-link transmission power of at least one coverage area in the modified active set.

20 Claims, 2 Drawing Sheets

SELECTING A POWER-CONTROL STEP SIZE BASED ON RELATIVE SIGNAL STRENGTH AMONG SIGNALS IN AN ACTIVE SET

BACKGROUND

1. Description of Related Art a. CDMA Networks Generally

Many people use mobile stations, such as cell phones and personal digital assistants (PDAs), to communicate with cellular wireless networks. These mobile stations and networks typically communicate with each other over a radio-frequency (RF) air interface according to a wireless communication protocol such as Code Division Multiple Access (CDMA), perhaps in conformance with one or more industry specifications such as IS-95 and IS-2000. Wireless networks that operate according to these specifications are also referred to as "1xRTT (1x) networks," which stands for "Single Carrier Radio Transmission Technology". These networks (referred to herein as "CDMA networks") typically provide communication services such as voice, Short Message Service (SMS) messaging, and packet-data communication.

Typical CDMA networks include a plurality of base stations, each of which provide one or more wireless coverage areas, such as cells and sectors. As a general matter, sectors are used herein as examples of wireless coverage areas. When a mobile station is positioned in a sector, it can communicate over the RF air interface with the base station, and in turn over one or more circuit-switched and/or packet-switched signaling and/or transport networks to which the base station provides access. The base station and the mobile station conduct these communications over a frequency known as a carrier. Note that base stations may provide service in a sector on one carrier, or on more than one, and further that a given instance of a given carrier in a given sector may be referred to herein as a "sector/carrier."

Communication, including voice and packet-data communication, between the mobile station and the base station is separated into forward-link communication (from the base station to the mobile station) and reverse-link communication (from the mobile station to the base station). And each carrier over which this communication takes place is typically actually a pair of distinct frequencies—one for the forward link and the other for the reverse link. This approach is known as frequency division duplex (FDD).

In a typical CDMA network, using a configuration known as radio configuration 3 (RC3), a base station can, on each sector/carrier, transmit forward-link data on a maximum of 64 distinct channels at any given time. Each of these 64 channels corresponds to a unique 64-bit code known as a Walsh code. Of these, typically, 61 channels are available for use as traffic channels (to carry user data), while the other 3 are reserved for administrative channels known as the pilot channel, the paging channel, and the sync channel.

In general, the pilot channel functions to alert mobile stations in a given sector of the presence of a service-providing base station. Typically, the pilot channel conveys a value known as a pseudorandom number (PN) offset, which identifies the sector; in particular, by being offset from CDMA system time by a certain amount of time, the pilot channel conveys the PN offset. Mobile stations generally use the pilot channel to coherently detect and demodulate the signal on a sector/carrier. The paging channel is typically used to transmit overhead messaging, such as incoming-call and message-waiting pages, as well as SMS messages, to mobile stations.

The paging channel typically also broadcasts values known as the system identification code (SID) and the network identification code (NID), which, taken together, help identify a given sector. The sync channel generally provides information that enables the base station and mobile stations to be precisely synchronized on CDMA system time.

When a base station instructs a mobile station to use a particular traffic channel for a particular communication session, the base station does so by instructing the mobile station to tune to a particular one of those 64-bit Walsh-coded traffic channels. It is over that assigned traffic channel that the base station will transmit forward-link data to the mobile station during the ensuing communication session. Note that, in addition to including the forward-link channel, the traffic channel also includes a corresponding Walsh-coded reverse-link channel, over which the mobile station transmits data to the base station. These traffic channels may be used for different types of communication, among which are second-generation (2G) voice, 2G data, third-generation (3G) voice, and 3G data.

In a typical wireless network, a mobile station can communicate with a number of "active" sectors or coverage areas at a time, typically known as the "active set" for that mobile station. Depending on the system, the number of active sectors can be up to three or six (currently), as examples. The mobile station receives substantially the same information from each of the coverage areas in the active set and, on a frame-by-frame basis, selects the best signal to use. The mobile station, one or more base stations, and/or a base station controller maintains in memory a list of the coverage areas in the mobile station's active set.

In existing systems, to facilitate a determination of which sectors should be in the mobile station's active set, all base stations emit a pilot channel signal, typically at a power level higher than other forward-link signals. A mobile station constantly measures the strength of each pilot that it receives and notifies at least one base station when pilot strength for various coverage areas falls above or below designated thresholds. The base station, may, in turn, provide the mobile station with an updated list of active pilot signals (i.e. an updated active set).

b. Forward-Link Transmission-Power Management i. The Power-Control Bit and the Ratio $E_b/N_t$ In CDMA networks, the transmitting power of a base station on a given sector/carrier is divided among the mobile stations to which the base station is transmitting voice data and/or packet data on traffic channels, as well as among the pilot, paging, and sync channels mentioned above. With respect to mobile stations that engage in 3G voice and 3G data communications, the amount of power that the base station is allocating to the transmission to any one mobile station on that mobile station's respective traffic channel at any given moment is based on a number of factors, two of which are known as the power-control bit (PCB) and the ratio $E_b/N_t$.

The PCB is a bit (0 or 1) that the mobile station sends to the base station on the reverse link at a high frequency, on the order of 800 times per second (i.e. once every 1.25 milliseconds (ms)). The base station repeatedly responsively adjusts the transmission power to the mobile station on the traffic channel. Typically, if the mobile station sends a 0, the base station will decrease the power by a set decrement, such as 1 dB, whereas, if the mobile station sends a 1, the base station will increase the power by a set increment (i.e., a forward-link power-control step size), which may also be 1 dB. Thus, the forward-link transmission power changes every 1.25 ms by plus or minus 1 dB.

A typical CDMA mobile station determines whether to transmit a PCB equal to 0 or 1 by comparing (i) a signal-to-noise ratio that the mobile station repeatedly computes with (ii) a stored threshold value for that signal-to-noise ratio. This ratio is generally known and referred to herein as "$E_b/N_t$," while the threshold is referred to herein as the "$E_b/N_t$ threshold." $E_b/N_t$ essentially compares the strength at which the mobile station is receiving the traffic-channel signal ($E_b$ for "energy per bit") with the strength at which the mobile station is receiving signals from all sources on the frequency of the sector/carrier ($N_t$ for "noise") As stated, then, $E_b/N_t$ is a signal-to-noise ratio for the traffic channel. And the mobile station typically computes $E_b/N_t$ at the same frequency at which it transmits the PCB, which again may be once every 1.25 ms.

Thus, in typical operation, every 1.25 ms, the mobile station compares the most recent computation of $E_b/N_t$ with the $E_b/N_t$ threshold. If $E_b/N_t$ exceeds the threshold, then the mobile station is receiving a strong enough signal on the traffic channel, and thus it transmits a PCB of 0, which causes the base station to reduce the forward-link power on that traffic channel. If, on the other hand, the computed $E_b/N_t$ is less than the threshold, the mobile station is not receiving a strong enough signal, and thus it transmits a PCB of 1, which causes the base station to increase the forward-link power. Thus, the forward-link power on the traffic channel typically stabilizes to a point that achieves an $E_b/N_t$ value (as measured at the mobile station) that is near the $E_b/N_t$ threshold. And this threshold can be changed during operation.

ii. Forward-Link Frame Error Rate (FFER)

In CDMA networks, data is transmitted from the base station to the mobile station (and vice versa) in data units that are known as frames, which typically last 20 ms. Some frames received by mobile stations contain errors as a result of imperfect transfer from the base station, while some do not. The forward-link frame error rate (FFER) is a ratio, also computed by the mobile station, of the number of error-containing frames that the mobile station receives to the total number of frames that the mobile station receives, over a given time period. Note that the FFER often also takes into account frames that are not received at all by the mobile station. And, other things being more or less equal, the more power that the base station allocates to a given mobile station, the lower the mobile station's FFER will be.

More particularly, at approximately the same frequency at which the mobile station is receiving forward-link frames (i.e. once every 20 ms), the mobile station computes its FFER over some previous number of frames, which may be 20, 100, 200, or some other number. Thus, the mobile station essentially computes a FFER for some rolling window of previous frames. And each time the mobile station computes its FFER, the mobile station compares that computed value with a threshold, often referred to as the "FFER target," which may be around 2%.

If the FFER exceeds the FFER target, the mobile station is experiencing too many error-containing and/or missed frames, and thus the mobile station will responsively increase its $E_b/N_t$ threshold. In the short term, this will result in the mobile station's computed $E_b/N_t$ falling below that increased threshold, which in turn will result in the mobile station repeatedly sending PCBs equal to 1 to the base station. This, in turn, will result in the base station increasing the forward-link transmission power to the mobile station on the traffic channel. The forward-link power will then typically stabilize at a level that will result in the mobile station computing an $E_b/N_t$ that is very close to its new $E_b/N_t$ threshold, and perhaps result in an acceptable FFER.

If, on the other hand, the FFER falls below the FFER target, the mobile station may be drawing excessive power from the base station on the forward-link—in essence, the mobile station's signal may be considered too strong, perhaps at the expense of other mobile stations on the sector/carrier. If that situation holds for a specified period of time, the mobile station may decrease its $E_b/N_t$ threshold, which will result in the mobile station's computed $E_b/N_t$ repeatedly exceeding that decreased threshold. This, in turn, will result in the mobile station repeatedly sending PCBs equal to 0 to the base station, which will result in the base station decreasing the forward-link transmission power to the mobile station on the traffic channel. Again, the forward-link power will then typically stabilize at a level that will result in the mobile station computing an $E_b/N_t$ that is very close to its new $E_b/N_t$ threshold.

Thus, the combination of (i) the mobile station's FFER target and (ii) the mobile station's repeated FFER calculation and comparison with the FFER target causes the mobile station to iteratively adjust its $E_b/N_t$ threshold. In turn, the mobile station's even-more-frequent calculation of $E_b/N_t$ and comparison with its current $E_b/N_t$ threshold causes the mobile station to iteratively send power-control bits of 0 (for less power) or 1 (for more power) to the base station, which then causes the base station to adjust the forward-link power on the traffic channel. This entire back-and-forth calibration process is conducted in an attempt to keep the mobile station's FFER at or below what is deemed to be an acceptable threshold, which again may be around 2%.

Note that different situations may present themselves on a given sector/carrier at different times. For one, the number of mobile stations using traffic channels can vary between just a few, such as 10, to a larger number, such as 30, and perhaps approach the upper bound of 61 (assuming RC3). And, as stated, the power that the base station allocates for transmission to these mobile stations can vary. Tn particular, variables such as terrain, weather, buildings, other mobile stations, other interference, and distance from the base station can affect the FFER that each mobile station experiences, and thus the amount of power the base station allocates for each mobile station. Since base stations have a finite amount of power that they can allocate to the mobile stations on a given sector/carrier, increasing the transmission power to some or all of those mobile stations generally results in the base station being able to serve fewer mobile stations on that sector/carrier. That is, it reduces capacity on the sector/carrier.

iii. The Logarithmic Ratio $E_c/I_{or}$

As explained, in CDMA networks, a given base station has a finite amount of power for transmitting on each sector/carrier on which it provides service. The base station divides this power among any active traffic channels (over which it is transmitting voice and/or packet data to mobile stations), as well as among the pilot, paging, and sync channels. Periodically, for a given sector/carrier, the base station calculates a ratio of (a) the power it is allocating for transmitting the pilot channel (the "pilot-channel power level") with (b) the power it is allocating for transmitting all (i.e. pilot, paging, sync, and traffic) channels (the "all-channel power level").

This ratio is a base-10 logarithmic one, and is known as "$E_c/I_{or}$." The pilot-channel power level is referred to as "$E_c$"—"energy per chip." The all-channel power level is referred to as "$I_{or}$." $E_c$ and $I_{or}$ can each be expressed in Watts (W), milliwatts (mW), or any other suitable units of measure. Note that $E_c$ and $I_{or}$ are often expressed as base-10 logarithmic ratios themselves, with respect to a reference power level of 1 mW. In that case, $E_c$ and $I_{or}$ would each typically be expressed using the unit "dBm," where "dB" indicates decibels and "m" indicates the reference power level. So, $E_c$ can be expressed as the base-10 logarithmic ratio of the pilot-channel power level (in mW) and 1 mW. And $I_{or}$ can be expressed as the base-10 logarithmic ratio of the all-channel power level (in mW) and 1 mW.

$E_c/I_{or}$ is typically expressed as the base-10 logarithmic ratio of the pilot-channel power level and the all-channel power level, each of which may be measured in Watts. As such, the typical unit of measure for $E_c/I_{or}$ is the decibel (dB). As an example, if a base station were allocating about 2 W (2000 mW) for the pilot channel, $E_c$ would be about 33 dBm, calculated as $10*\log((2000 \text{ mW})/(1 \text{ mW}))$. And if the base station were allocating a total of about 10 W (10,000 mW) for the pilot, paging, sync, and active traffic channels, $I_{or}$ would be about 40 dBm, calculated as $10*\log((10000 \text{ mW})/(1 \text{ mW}))$. In this example, $E_c/I_{or}$ would be about −7 dB, calculated as $10*\log((2 \text{ W})/(10 \text{ W}))$. Note that, in this example, the $I_{or}$ value represents the noise from only one base station, but in practice the $I_{or}$ value is actually a measurement that includes, for example, ambient noise and noise generated from other surrounding base stations and/or other networks. Note also that $E_c/I_{or}$ will always be negative, as long as at least some power is allocated for any one or any combination of the paging, sync, and traffic channels.

As another example, a typical base station may have 16 W of power that it can potentially use for transmitting all channels on a sector/carrier, and may allocate 15% (2.4 W) of that for the pilot channel, 10% (1.6 W) for the paging channel, and 5% (0.8 W) for the sync channel. When that base station is not serving any mobile stations on active traffic channels on the sector/carrier, i.e. when the sector/carrier is "unloaded," $E_c/I_{or}$ would be approximately −3 dB, which then, would be about as high as $E_c/I_{or}$ gets. Thus, for reference, any value close to −2 or −3 dB may be considered relatively high for $E_c/I_{or}$.

And when that same base station is at or near capacity ("fully loaded"), the 15% of its potential sector/carrier power that it is allocating for the pilot channel would shrink from being half of its power output on the sector/carrier (in the unloaded scenario) to, not surprisingly, being about 15% of its power output. This would yield an $E_c/I_{or}$ of approximately −16 dB to −18 dB, which then would be about as low as $E_c/I_{or}$ gets. In fact, a typical base station may be configured to stop accepting new mobile stations on a sector/carrier once $E_c/I_{or}$ degrades to about −16 dB. Thus, $E_c/I_{or}$ can impact sector/carrier capacity as well.

When $E_c/I_{or}$ is relatively high, this could mean a number of things. For example, there could be only a few mobile stations on the sector/carrier (i.e. the sector/carrier is lightly loaded), which would generally lead to a higher ratio of pilot-channel power allocation to total power allocation (with relatively few traffic channels to which to allocate power). Instead or in addition, it could mean that RF conditions are favorable, such that no (or relatively few) mobile stations are experiencing a poor FFER. In that situation, there would be no (or relatively few) mobile stations inducing the base station to increase power on the traffic channels. This would tend to keep the value of $E_c/I_{or}$ relatively high. And other possibilities exist as well.

When $E_c/I_{or}$ is relatively low, this also could mean a number of things. For example, there could be a relatively high number of mobile stations on the sector/carrier (i.e. the sector/carrier is heavily loaded), and thus a high number of active traffic channels contributing to a high value of $I_{or}$, and thus a low value of $E_c/I_{or}$. Instead or in addition, it could mean that RF conditions are poor (e.g., due to terrain, weather, interference, etc.); in that case, mobile stations would likely experience poor FFER, and induce the base station to increase power on the traffic channels, which would contribute to a higher $I_{or}$ and thus a lower $E_c/I_{or}$. And other possibilities exist as well.

Overview

Methods and apparatus are provided for adjusting a forward-link power-control step size. In accordance with the method, an initial active set of coverage areas for a mobile station is maintained, wherein a first coverage area in the initial active set has a signal strength that is stronger than that of each of the other coverage areas in the initial active set, as received at the mobile station. The first coverage area is determined to have dropped from the initial active set, resulting in a modified active set. In response, a signal-strength factor is calculated based on (a) a last non-zero signal-strength measurement of the first coverage area and (b) a second value, wherein the second value is based on at least one of (i) a signal-strength measurement of at least one coverage area in the initial active set and (ii) a signal-strength measurement of at least one coverage area in the modified active set. One or more forward-link power-control step sizes is selected, based on at least the calculated factor. The one or more selected step sizes is used to increase the forward-link transmission power of at least one coverage area in the modified active set.

One embodiment may take the form of a base station controller or a mobile station capable of adjusting a forward-link power-control step size, the base station controller comprising: (a) a wireless-communication interface, (b) a processor, and (c) data storage containing program instructions executable by the processor for carrying out the methods described herein.

One beneficial effect of the presently described methods and apparatus is to, if necessary, quickly ramp up the transmission power of a base station to a mobile station to maintain call connection and quality. This as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Introduction

The inventors of the presently disclosed methods and apparatus have recognized that conventional methods for forward-link and reverse-link power control do not always act as rapidly as desired to counteract sudden changes in a mobile station's active set. For example, when the strongest sector suddenly drops from the active set, the collective signal quality as received at the mobile station may become poor so quickly that conventional power-control methods are unable to counteract the problem before the call is dropped or call quality is affected.

To address the limitations of conventional power-control methods, disclosed herein are methods and apparatus varying power-control-adjustment increments (i.e. step sizes). For example, when it is detected that a strongest sector has dropped from a mobile station's active set (resulting in a modified active set), forward-link power-control step sizes for one or more coverage areas remaining in that mobile station's modified active set may be adjusted based on (a) a last non-zero signal-strength measurement of a first coverage area and (b) a second value that is based on at least one of (i) a signal-strength measurement of at least one coverage area in the initial active set and (ii) a signal-strength measurement of at least one coverage area in the modified active set. So, when the strongest sector suddenly drops from the mobile station's active set, power-control step sizes are adjusted (i.e., increased) to allow transmission power to ramp up quickly to maintain call quality and perfomiance.

2. Exemplary Architecture a. Exemplary Communication System

Figure 1:
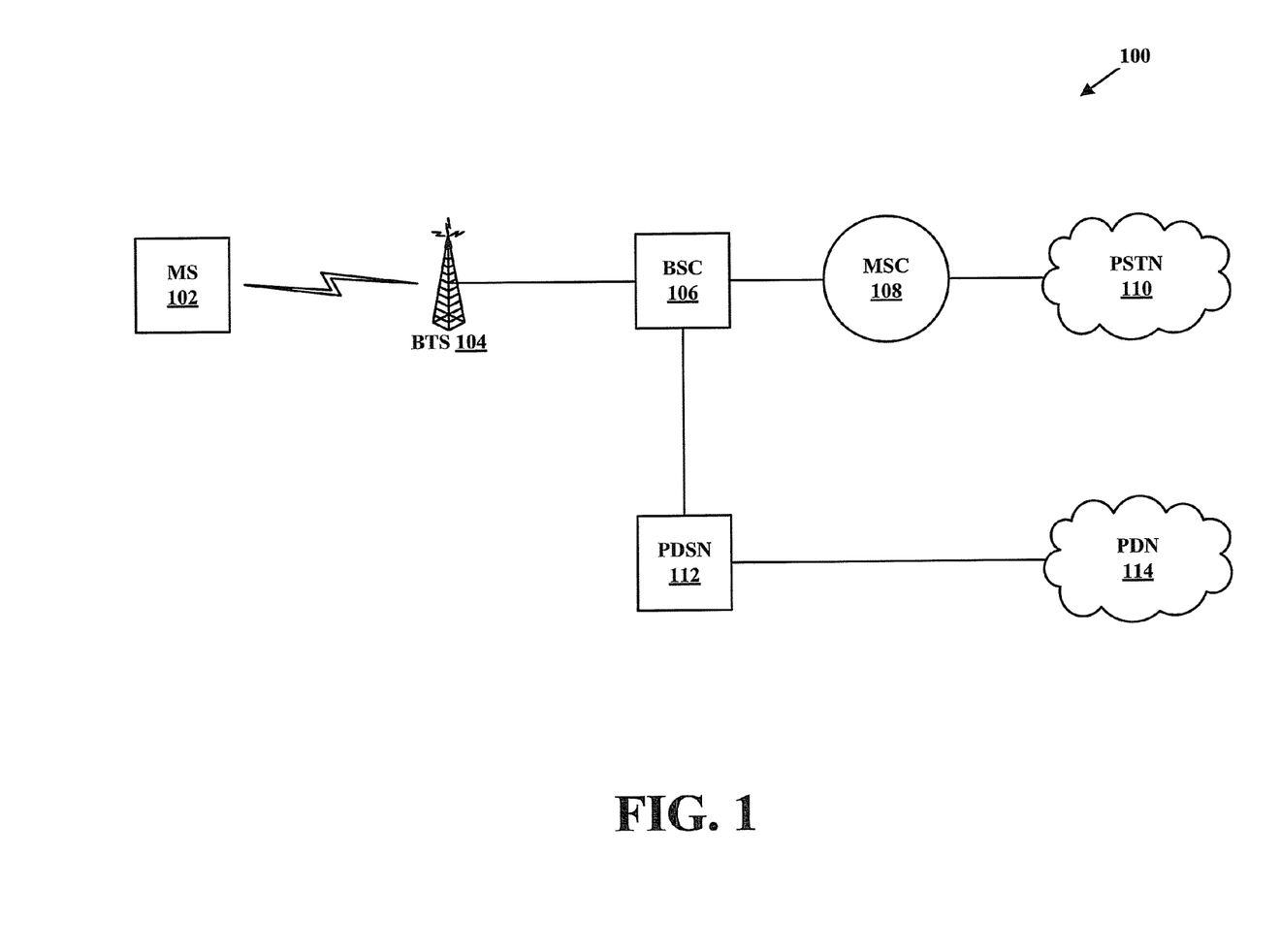
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present, such as additional mobile stations in communication with BTS 104, additional BTSs in communication with BSC 106, and additional BSCs in communication with MSC 108, etc.; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114. And PSTN 110 and PDN 114 may be connected via one or more gateways and/or other devices. And other variations and/or additions are possible as well.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Note that the combination of BTS 104 and BSC 106 may be considered—and referred to herein as—a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the scope or spirit of the present invention.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations, such as mobile station 102, over an air interface. The communication interface may also include one or more wired and/or wireless interfaces for communicating with at least BSC 106. As an example, a wired Ethernet interface may be included.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

3. Exemplary Operation

Figure 2:
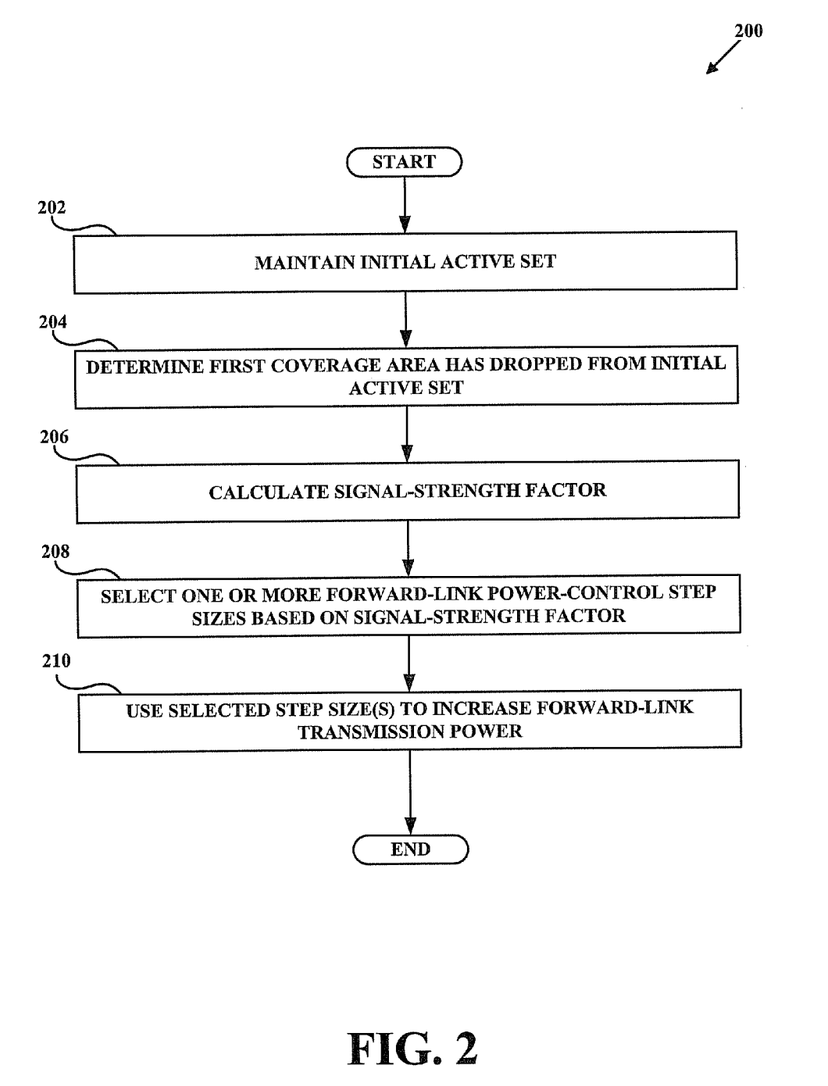
FIG. 2 is a flowchart of a method, in accordance with exemplary embodiments.

FIG. 2 depicts a flowchart of a method, in accordance with exemplary embodiments. As shown in FIG. 2, method 200 begins at step 202, when BSC 106 maintains an initial active set of coverage areas for a mobile station, wherein a first coverage area in the initial active set has a signal strength that is stronger than that of each of the other coverage areas in the initial active set, as received at the mobile station. At step 204, BSC 106 determines that the first coverage area has dropped from the initial active set, resulting in a modified active set. In response, at step 206, the BSC 106 calculates a signal-strength factor based on (a) a last non-zero signal-strength measurement of the first coverage area and (b) a second value, wherein the second value is based on at least one of (i) a signal-strength measurement of at least one coverage area in the initial active set and (ii) a signal-strength measurement of at least one coverage area in the modified active set. At step 208, the BSC 106 selects one or more forward-link power-control step sizes, wherein selection of the one or more forward-link power-control step sizes is based on at least the calculated factor. At step 210, the BSC 106 uses the one or more selected step sizes to increase forward-link transmission power of at least one coverage area in the modified active set. These steps are further explained in the following subsections.

Note that method 200 is described herein as being carried out by BSC 106. This, however, is not required. In general, method 200 can be carried out by any one or any combination of the MS 102, BTS 104, BSC 106, MSC 108, PDSN 110, a device known as a radio network controller, a device known as an access node, a computer, a server, another network entity, and any combination thereof.

i. Maintain Initial Active Set of Coverage Areas

At step 202, BSC 106 maintains an initial active set of coverage areas for a mobile station, each coverage area having a signal strength as received at the mobile station, wherein a first coverage area in the initial active set has a signal strength that is stronger than that of each of the other coverage areas in the initial active set. As one example, maintaining the initial active set may comprise the BSC 106 storing at least a most recent signal-strength measurement (SSM) for each coverage area in the initial active set. Alternatively, the MS 102 may store at least the most recent SSM for each coverage area in the initial active set and then continuously transmit this information to the BSC 106.

Due to the properties of CDMA signaling, a mobile station may simultaneously receive two or more signals from two or more respective coverage areas of one or more BTS 104. The BCS 106 or MS 102 continuously measures the signal strength of each coverage area to determine the strongest signals, which ultimately make up the active set. An active set may comprise two or more coverage areas and typically comprises about six coverage areas. As used herein, the coverage area referred to as the first coverage area of the active set may change over the life of a phone call. As used herein, the "first coverage area" is the one that, just before it is dropped from the mobile station's active set, is providing the strongest signal (as received at the MS 102) among the coverage areas in the mobile station's active set. As used herein, an initial active set is defined as the mobile station's active set at the time that last non-zero SSM from the first coverage area is taken/observed by the MS 102.

ii. Determine First Coverage Area has Dropped

At step 204, BSC 106 determines that the first coverage area has dropped from the initial active set, resulting in a modified active set. BSC 106 makes this determination using programming logic to recognize that a zero-value SSM (or no SSM at all) is reported by the MS 102 for the first coverage area. Note that step 204 is not applicable to a situation in which the signal from the first coverage area gradually fades, because, in that instance, another coverage area would become the strongest coverage area in the active set prior to the first coverage area dropping from the active set. Rather, this applies where the first coverage area is suddenly dropped from the active set altogether. As used herein, the modified active set is the set of coverage areas from the initial active set that still remain in the active set right when a zero-value SSM (or no SSM at all) for the first coverage area is first received by either the BSC 106 or MS 102.

iii. Calculate a Signal-Strength Factor

At step 206, in response to determining a first coverage area has dropped from the active set, BSC 106 calculates a signal-strength factor based on (a) a last non-zero signal-strength measurement of the first coverage area and (b) a second value, wherein the second value is based on at least one of (i) a signal-strength measurement of at least one coverage area in the initial active set and (ii) a signal-strength measurement of at least one coverage area in the modified active set.

As one example, at step 206, BSC 106 may calculate the factor by calculating a difference between (i) a last non-zero signal-strength measurement of the first coverage area and (ii) the second value. As another example, at step 206, BSC 106 may calculate the factor by calculating a ratio of (i) the last non-zero signal-strength measurement of the first coverage area to (ii) the second value.

As used herein, the second value may be (i) the signal strength of a second-strongest coverage area in the initial active set, or (ii) the signal strength of the strongest coverage area in the modified active set, or (iii) the signal strength of a weakest coverage area in the initial or modified active set, or (iv) an average of the signal strengths of all the coverage areas except for the first coverage area in the initial active set, or (v) an average of the signal strengths of all the coverage areas in the modified active set. To illustrate, the following data set will be used to present examples throughout this section, where the signal strengths correspond to $E_c/I_{or}$ (dB) (though the signal strength could also be shown as $E_c$ measured in dBm or as $I_{or}$ measured in dBm):

Initial Active Set:
Coverage Area A with SSM: −4 dB
Coverage Area B with SSM: −6 dB
Coverage Area C with SSM: −6 dB
Coverage Area D with SSM: −8 dB
Modified Active Set:
Coverage Area A has dropped from the active set with SSM: 0 dB
Coverage Area B with SSM: −5 dB
Coverage Area C with SSM: −7 dB
Coverage Area D with SSM: −8 dB.

In view of the foregoing exemplary data set and that coverage area A: −4 dB corresponds to the first coverage area in the initial active set, the second value for each of the embodiments listed above would be, respectively:

(i) −6 dB (ii) −5 dB
(iii) −8 dB (D: −8 dB in initial active set; D: −8 dB in modified active set)
(iv) −6.67 dB (average of −6, −6, and −8 dB)
(v) −6.67 dB (average −5, −7, −8, and −8 dB).

iv. Select One or More Forward-Link Power-Control Step Sizes

At step 208, BSC 106 selects one or more forward-link power-control step sizes, based on at least the calculated factor from step 206. Note that BSC 106's selection of the one or more forward-link power-control step sizes may consist of selecting one forward-link power-control step size. As one example, BSC 106 selects the one forward-link power-control step size by: (i) maintaining a set of predetermined factors (which could be ranges), wherein each predetermined factor is associated with a power-control step size, (ii) identifying the predetermined factor that corresponds to the calculated factor, and (iii) selecting the power-control step size associated with the identified predetermined factor.

As used herein, a set of predetermined factors are either individual values (such as those shown in Table 1) or ranges of values (such as those shown in Table 2) that correspond to, for example, the difference between or the ratio of (i) the last non-zero SSM of the first coverage area to (ii) the second value. The set of predetermined factors could also correspond to the potential values resulting from any other method of calculating the signal-strength factor. And, as stated, the set of predetermined factors may be implemented as either ranges or individual values. To illustrate, using the previous data set, where the last non-zero SSM of the first coverage area is −4 dB and the second value is the weakest value of either active set, −8 dB, and the calculated factor is the difference between them, 4 dB, then, consulting Table 1 the corresponding selected power-control step size would be 5 dB. Note that the default power-control step size refers to the system-configured step size that is utilized prior to the first coverage area being dropped. As such, these two terms are used interchangeably.

TABLE 1

| Predetermined Factor (dB) | Power-Control Step Size (dB) |
| --- | --- |
| 0 | Default |
| 1 | 2 |
| 2 | 3 |
| 3 | 4 |
| 4 | 5 |
| 5 | 5 |

TABLE 2

| Predetermined Factor (dB) | Power-Control Step Size (dB) |
| --- | --- |
| X ≤ 0.18 | 6 |
| 0.18 < X ≤ 0.25 | 5 |
| 0.25 < X ≤ 0.33 | 4 |
| 0.33 < X ≤ 0.5 | 3 |
| 0.5 < X < 1.0 | 2 |
| X = 1.0 | Default |

As another example, BSC 106 selects the one forward-link power-control step size by: (i) maintaining a set of predetermined factors, wherein each predetermined factor is associated with a power-control-step-size multiplier, (ii) identifying the predetermined factor that corresponds to the calculated factor, (iii) selecting the multiplier associated with the identified predetermined factor, (iv) calculating a product of the selected multiplier and a default power-control step size associated with at least one of the coverage areas in the initial or modified active set, and (v) setting the power-control step size equal to a lesser of the product and a maximum-allowed power-control step size. To illustrate, using the previous data set and Table 3, the last non-zero SSM of the first coverage area is −4 dB and the second value −8 dB, then the calculated factor is the difference between them, which is 4 dB. So the corresponding power-control-step-size multiplier is 2.25, which results in a power-control step size of 2.25 dB if the default power-control step size is 1 dB. If the default power-control step size was instead 2 dB, for example, then the power-control step size would be 4.5 dB. And other examples are clearly possible as well.

TABLE 3

| Predetermined Factor (dB) | Power-Control-Step-Size Multiplier |
| --- | --- |
| 0 | 1 |
| 1 | 1.5 |
| 2 | 1.75 |
| 3 | 2 |
| 4 | 2.25 |
| 5 | 2.5 |

In addition to the selection of the one or more forward-link power-control step sizes being based on the calculated factor, the selection may also be based on: (i) a total number of coverage areas in the initial or modified active set, (ii) a default power-control step size associated with at least one of the coverage areas in the initial or modified active set. To illustrate, using the values in Table 4 and a default power-control step size of 1 dB, if the last non-zero SSM of the first coverage area is −4 dB and the second value −8 dB, then the calculated factor is the difference between them, which is 4 dB. So the corresponding power-control-step-size multiplier is 2.5, which results in a power-control step size of 2.5 dB. If the default power-control step size was instead 2 dB, then the power-control step size would be 4 dB (with a multiplier of 2.0).

TABLE 4

| Predetermined Factor (dB) | System-Configured Step Size (dB) | Power-Control-Step-Size Multiplier |
| --- | --- | --- |
| 0 | X | 1.0 |
| 1 | 1 | 1.0 |
| 1 | 2 | 1.0 |
| 2 | 1 | 1.5 |
| 2 | 2 | 1.0 |
| 3 | 1 | 1.75 |
| 3 | 2 | 1.5 |
| 4 | 1 | 2.5 |
| 4 | 2 | 2.0 |
| 5 | 1 | 2.5 |
| 5 | 2 | 2.25 | v. Use the One or More Selected Step Sizes

At step 210, BSC 106 uses the one or more selected step sizes to increase the forward-link transmission power of at least one coverage area in the modified active set. As one example, the BSC 106 applies a selected power-control step size to every coverage area in the modified active set. In one embodiment, the one or more selected power-control step sizes is the same for all of the coverage areas in the modified active set. Alternatively, the one or more selected power-control step sizes may not be the same for all of the coverage areas in the modified active set.

In another embodiment, BSC 106 may apply a selected power-control step size to either the strongest coverage area or the weakest coverage area in the modified active set.

In an additional embodiment, the foregoing method may include the additional step of the BSC 106 reverting to a default power-control step size in response to receiving a power-down command from the MS 102, which may occur when a predetermined power-control threshold has been exceeded by power transmissions from the BTS 104.

In a further embodiment, the foregoing method may include the additional step of the BSC 106 using the one or more selected step sizes to also increase the MS 102's reverse-link transmission power for at least one coverage area in the modified active set. MS 102 may increase the reverse-link transmission power using same the selected step size or, alternatively, some fraction thereof. For example, if the selected step size is 4 dB for forward-link transmission power, the selected step size for reverse-link transmission power may be one half of that value, or 2 dB.

4. CONCLUSION

Various exemplary embodiments have been described above. Those skilled in the art will understand, however, that changes and modifications may be made to those examples without departing from the scope of the claims.

What is claimed is:

1. A method for adjusting a power-control step size, the method comprising:
    maintaining an initial active set of coverage areas for a mobile station, each coverage area having a signal strength as received at the mobile station, wherein a first coverage area in the initial active set has a signal strength that is stronger than that of each of the other coverage areas in the initial active set;
    determining that the first coverage area has dropped from the initial active set, resulting in a modified active set, and responsively:
    calculating a signal-strength factor based on (a) a last non-zero signal-strength measurement of the first coverage area and (b) a second value, wherein the second value is based on at least one of (i) a signal-strength measurement of at least one coverage area in the initial active set and (ii) a signal-strength measurement of at least one coverage area in the modified active set;
    selecting one or more forward-link power-control step sizes, wherein selection of the one or more forward-link power-control step sizes is based on at least the calculated factor; and
    using the one or more selected step sizes to increase a forward-link transmission power of at least one coverage area in the modified active set.

2. The method of claim 1, wherein maintaining the initial active set comprises storing at least a most recent signal-strength measurement for each coverage area in the initial active set.

3. The method of claim 1 further comprising:
    reverting to a default power-control step size in response to receiving a power-down command from the mobile station.

4. The method of claim 1, wherein calculating the factor comprises calculating:
    (a) a difference between (i) a last non-zero signal-strength measurement of the first coverage area and (ii) the second value or (b) a ratio of (i) the last non-zero signal-strength measurement of the first coverage area to (ii) the second value.

5. The method of claim 4, wherein the second value is a signal strength of a weakest coverage area in the initial or modified active set.

6. The method of claim 4, wherein the second value is (i) the signal strength of a second-strongest coverage area in the initial active set or (ii) the signal strength of the strongest coverage area in the modified active set.

7. The method of claim 4, wherein the second value is an average of (i) the signal strengths of all the coverage areas except for the first coverage area in the initial active set or (ii) the signal strengths of all the coverage areas in the modified active set.

8. The method of claim 1, wherein selecting the one or more forward-link power-control step sizes is based on at least the calculated factor and a total number of coverage areas in the initial or modified active set.

9. The method of claim 1, wherein selecting the one or more forward-link power-control step sizes is based on at least the calculated factor and a default power-control step size associated with at least one of the coverage areas in the initial or modified active set.

10. The method of claim 1, wherein selecting the one or more forward-link power-control step sizes consists of selecting one forward-link power-control step size.

11. The method of claim 10, wherein selecting the one forward-link power-control step size comprises:
    maintaining a set of predetermined factors, wherein each predetermined factor is associated with a power-control step size;
    identifying the predetermined factor that corresponds to the calculated factor; and
    selecting the power-control step size associated with the identified predetermined factor.

12. The method of claim 10, wherein selecting the one forward-link power-control step size comprises:
    maintaining a set of predetermined factors, wherein each predetermined factor is associated with a power-control-step-size multiplier;
    identifying the predetermined factor that corresponds to the calculated factor;
    selecting the multiplier associated with the identified predetermined factor;
    calculating a product of the selected multiplier and a default power-control step size associated with at least one of the coverage areas in the initial or modified active set; and
    setting the power-control step size equal to a lesser of the product and a maximum-allowed power-control step size.

13. The method of claim 1, wherein using the one or more selected step sizes to increase the forward-link transmission power of at least one coverage area in the modified active set comprises applying the one or more selected power-control step sizes to every coverage area in the modified active set.

14. The method of claim 13, wherein the one or more selected power-control step sizes is the same for all of the coverage areas in the modified active set.

15. The method of claim 13, wherein the one or more selected power-control step sizes is not the same for all of the coverage areas in the modified active set.

16. The method of claim 1, wherein using the one or more selected power-control step sizes to increase the forward-link transmission power of at least one coverage area in the modified active set comprises applying a selected power-control step size to a strongest coverage area in the modified active set.

17. The method of claim 1, wherein using the one or more selected power-control step sizes to increase the forward-link transmission power of at least one coverage area in the modified active set comprises applying a selected power-control step size to a weakest coverage area in the modified active set.

18. The method of claim 1, further comprising:
using the one or more selected step sizes to increase a reverse-link transmission power of at least one coverage area in the modified active set.

19. A base station controller capable of adjusting a forward-link power-control step size, the apparatus comprising:
a wireless-communication interface;
a processor; and
data storage containing program instructions executable by the processor for:
(i) maintaining an initial active set of coverage areas for a mobile station, each coverage area being associated with a signal, wherein a first coverage area in the initial active set has a signal strength that is stronger than that of each of the other coverage areas in the initial active set, as received at the mobile station;
(ii) determining that the first coverage area has dropped from the initial active set, resulting in a modified active set, and responsively:
calculating a signal-strength factor based on (a) a last non-zero signal-strength measurement of the first coverage area and (b) a second value, wherein the second value is based on at least one of (i) a signal-strength measurement of at least one coverage area in the initial active set and (ii) a signal-strength measurement of at least one coverage area in the modified active set;
selecting one or more forward-link power-control step sizes, wherein selection of the one or more forward-link power-control step sizes is based on at least the calculated factor; and
using one or more selected step sizes to increase a forward-link transmission power of at least one coverage area in the modified active set.

20. A mobile station capable of adjusting a forward-link power-control step size, the apparatus comprising:
a wireless-communication interface;
a processor; and
data storage containing program instructions executable by the processor for:
(i) maintaining an initial active set of coverage areas for a mobile station, each coverage area being associated with a signal, wherein a first coverage area in the initial active set has a signal strength that is stronger than that of each of the other coverage areas in the initial active set, as received at the mobile station;
(ii) determining that the first coverage area has dropped from the initial active set, resulting in a modified active set, and responsively:
calculating a signal-strength factor based on (a) a last non-zero signal-strength measurement of the first coverage area and (b) a second value, wherein the second value is based on at least one of (i) a signal-strength measurement of at least one coverage area in the initial active set and (ii) a signal-strength measurement of at least one coverage area in the modified active set;
selecting one or more forward-link power-control step sizes, wherein selection of the one or more forward-link power-control step sizes is based on at least the calculated factor; and
communicating the one or more selected step sizes to a base station controller for use to increase a forward-link transmission power of at least one coverage area in the modified active set.

* * * * *